United States Patent [19]
Bolduc

[11] 3,885,775
[45] May 27, 1975

[54] VEHICLE SUSPENSION DEVICE

[76] Inventor: Germain C. Bolduc, 54 Rabbit Rd., Salisbury, Mass. 01950

[22] Filed: Jan. 24, 1974

[21] Appl. No.: 436,220

[52] U.S. Cl. .................. 267/11; 280/124; 267/57
[51] Int. Cl. ............................................. B60g 21/02
[58] Field of Search ....... 267/57; 280/124 R, 124 B, 280/104, 104.5 R

[56] References Cited
UNITED STATES PATENTS

| | | | |
|---|---|---|---|
| 3,054,625 | 9/1962 | Haley | 267/57 |
| 3,218,053 | 11/1965 | Shreve | 267/57 |
| 3,589,700 | 6/1971 | Ruet et al. | 267/57 |
| 3,733,087 | 5/1973 | Allison | 267/57 |

*Primary Examiner*—James B. Marbert
*Attorney, Agent, or Firm*—Kenway & Jenney

[57] ABSTRACT

A vehicle suspension device comprising a cross-bar having a first arm disposed near one cross-bar endpoint and a second arm disposed near the other cross-bar endpoint and wherein each arm is associated with a side of the drive axle housing. Each arm is connected by a flexible joint to an associated extension bar. The cross-bar includes a mounting means for mounting the cross-bar to the vehicle sprung assembly so that the cross-bar longitudinal axis is substantially parallel to the longitudinal axis of the drive axle assembly of an automobile. The mounting means permits the cross-bar to rotate about its longitudinal axis. The flexible joint means permits the each arm to rotate about an associated axis parallel to the driving axle axis. A non-pivoting connection means is positioned at the end of each extension bar which opposes its respective flexible joint means in order to connect the associated side of the drive axle housing to the each arm by way of its associated extension bar and flexible joint means. The non-pivoting connection means couples the extension bars to the respective sides of the drive axle housing so that rotational motion of the drive axle housing about its longitudinal axis is transformed to force components on the extension bars. These force components are transferred to the vehicle sprung assembly in a manner which offsets both unmatched vertical displacements of the vehicle wheels relative to the sprung assembly and also relative unweighting of a drive wheel.

6 Claims, 10 Drawing Figures

VEHICLE SUSPENSION DEVICE

BACKGROUND OF THE INVENTION

This invention relates to automotive vehicles and more particularly to suspension devices for solid-type drive axle vehicles.

Solid-type drive axle vehicles are well known in the art wherein the drive axle assembly is connected by a spring means to the vehicle frame and includes a differential gear assembly for coupling a drive shaft to an axle element associated with each driving wheel. Such drive axle assemblies further include an axle housing associated with each axle element, each axle housing being rigidly connected to a housing for the differential gear assembly.

It is further known in the art to include a stabilizer bar in the suspension system of an automotive vehicle to aid in maintaining the transverse axis of the sprung assembly (i.e. the frame of sub-frame) substantially parallel to the longitudinal axis of the drive axle assembly. In such an application, a stabilizer bar is generally provided having a cross-bar with two equal length arms, each extending from, or near, a respective cross-bar end. The cross-bar is generally connected to the automobile frame (or sub-frame), by connecting means which permit the cross-bar to rotate freely about its longitudinal axis and so that the longitudinal axis of the cross-bar is substantially parallel to the longitudinal axis of the drive assembly. The arms are connected at their other ends to the respective sides of the axle housing by a substantially similar junction means. Each junction includes a flexible joint means which permits pivotal movement of its associated arm about a single axis parallel to the longitudinal axis of the drive axle assembly. The junction means further includes an extension bar(connected to each arm via the associated flexible joint)and a non-pivoting connection means which connects each extension bar to its associated side of the drive axle housing so that a rotational movement of the axle housing drives both extension bars to rotate about the drive axle axis in the same manner and to the same extent.

In the operation of such a conventional stabilizer bar, an external force which produces a vertical displacement on a first driving wheel (relative to the sprung assembly, i.e. the automobile frame) is transformed by the stabilizer bar to produce a compensatory force component on the opposite driving wheel. This latter force tends to produce an identical vertical displacement of the opposite wheel relative to the frame. To produce this effect, the external force on a wheel is applied by way of the axle housing and the junction means to the end point of the arm associated with the wheel, thereby producing a torque about the cross-bar longitudinal axis. This torque is effectively transferred to the opposite wheel via the other arm, junction means and axle housing. Thus, the conventional stabilizer bar effectively provides an offsetting force for transverse tilting of the automotive frame (i.e. about the front-rear axis) which may be caused by an unmatched vertical displacement of one wheel relative to the frame due to either cornering or frame twisting provided by the reaction forces of the engine as transmitted via the motor mounts. Due to the symmetry of the stabilizer bar (i.e. the substantially similar junction means associated with each arm) a stabilizer bar produces no effect in response to the application of identical forces at each junction means such as may be generated by axle housing twist forces.

It is further well known in the art to provide one or more torque arms (or "traction" bars) as a portion of the suspension in automobiles having the drive axle assembly connected to the frame (or sub-frame) by leaf spring means. Each torque arm is generally provided in the form of a rigid bar connected at a first end to a side of the drive axle housing in a non-pivoting manner and, at the other end, positioned to be in contact with a lower surface of the automobile frame at a point in front of the associated driving wheel.

The function of the torque arm in such a configuration is to aid the automobile in accommodating periods of rapid acceleration. Under such acceleration conditions, when the rear wheels are driven in a forward direction by substantially high forces while maintaining a substantial degree of traction with the road surface, the axle housing is subjected to a twisting reaction force in an opposing direction to the wheel motion. The twisting force on the axle housing in some cases involving extremely high powered vehicles may be sufficient to break the one or more leaves of a leaf spring connected to that axle housing (or at least to break the mounting connection to that spring). Generally, automobiles are manufactured such that leaf springs and connection means for the springs are able to withstand the twisting forces applied to the connection means by the axle housing. However, in certain applications, (e.g. acceleration contests or drag races) the extreme driving force from high powered engines which are applied to the driving wheels produce a sufficient opposing twisting force on the axle housing that can surpass the capacity of the standard (and also specially) designed spring mounting means. The function of the torque arm is to transmit this twisting force on the axle housing by way of the non-pivoting connection and the torque arm to the frame at the point of contact of the frame and torque arm. During periods of high acceleration, the twisting force is thus transferred by the torque arm to the frame section immediately in front of the driving wheel. It will be understood that in most applications involving rear wheel drive automobiles, the right rear wheel becomes lesser weighted (than the left) during periods of high acceleration and, consequently tends to slip, losing frictional contact with the road surface. Thus only a torque arm on that side of the vehicle is required in most cases, although it is also known in the art to employ torque arms on both sides for such drag racing vehicles.

It will be understood that both the effects treated by the stabilizer bar and the torque arm, as discussed above, occur simultaneously during periods of acceleration. Although, these devices do provide some improvement in the operation of the vehicle under such conditions, it will be understood that in the prior art separate devices, i.e. a stabilizer bar and a torque arm, are required to perform these compensatory actions. Accompanying these separate devices are the corresponding expense and increased probability of failure due to increased parts count in the suspension system.

SUMMARY OF THE INVENTION

Accordingly, it is an object of the invention to provide a vehicle suspension device for offsetting the effects of twisting displacements of the driving axle housing and unmatched vertical displacements of a side of the vehicle frame relative to the associated drive wheel.

In accordance with the present invention, a cross-bar is positioned so that the longitudinal axis thereof is substantially parallel to the longitudinal axis of the drive axle assembly of an automobile. It will be understood that each end of the cross-bar is associated with the driving wheel and axle housing on its side. The cross-bar is mounted on the automobile sprung assembly, i.e., the frame (or sub-frame) by a connection means which permits rotation of the cross-bar about its longitudinal axis. Near the first end of a cross-bar, a first arm is provided to extend therefrom. This arm is connected at its extremity via first junction means comprising a flexible joint, extension bar, and non-pivoting connection means to the drive axle housing (on the side associated with the first end of the cross-bar) in a manner permitting rotation of the first arm about a first joint axis parallel to the longitudinal axis of the drive axle assembly. Near the other end of the cross-bar, a second arm is provided extending therefrom and connected at its extremity via a second junction means comprising a flexible joint, an extension bar and non-pivoting connection means to the driving axle housing (on the side associated with the second end of the cross-bar) in a manner permitting rotation of the second arm about a second joint axis parallel to the longitudinal axis of the drive axle assembly. The non-pivoting connection means associated with each extension bar is such that both rotation of the dirve axle housing about the longitudinal axis of the drive axle assembly and vertical displacement of the drive axle housing relative to the frame is coupled to the first and second arm extremal points. The first and second junction means are non-identical so that the resultant coupling provides that the torque resultant about the cross-bar longitudinal axis which is applied to the first arm end point has a different magnitude than the corresponding torque applied to the second arm end point.

In operation during periods of high acceleration of a rear wheel drive automobile, the following two effects result from the clockwise crankshaft rotation (as viewed from the automobile front) of the engine and the transfer of this rotation to a forward driving action on the rear wheels, the wheels being in good frictional contact with a road surface: (1) an upward force is applied to the axle and housing on the right rear side and a downward force on the axle and housing on the left rear side and opposing forces on the respective sides of the vehicle frame (resulting from the clockwise rotation of the drive shaft coupled from the engine through differential to the axle housings and the opposing forces applied to the frame from the engine via the engine mounts), and (2) the drive axle housing portions associated with each drive wheel are subjected to substantially identical twisting forces about the rear axle axis in an opposing direction to the direction of rotation of the driven wheels. The net result of these two effects is two-fold during periods of high acceleration: first, the right rear wheel is maintained with a substantially smaller downward force ("lesser weighted") applied on that wheel (compared to the downward force on the opposite wheel, i.e. the right rear wheel is lesser weighted than the left) tending to cause wheel slippage at that wheel, and, second, the twisting force from the axle housing may be in excess of the design limits for the rear spring mounting means or the means for connecting the axle housings to the rear springs, resulting in severe strain and often breakage of the mounting or connection means, or both.

The use of a suspension device in accordance with the present invention, as described above, offsets both of these effects and thus avoids the above cited results. As a consequence of the first effect described above, each extension bar is driven to rotate about the longitudinal axis of the rear axle assembly to apply a force in a substantially vertical direction to the end point of the associated arm. In response thereto, the each arm of the suspension device couples the resultant applied torque about the longitudinal axis of the cross-bar to the arm at the other end of the cross-bar. Due to the structural differences in the first and second junction means, the net effect of the torque transfer is to apply vertical upward force to the axle housing on the side associated with the lesser weighted wheel. The direction of this latter force is such that the force tends to offset the first effect cited above (i.e. the opposed force pair on the respective axles and housing and equalize the downward force on the rear wheels). Thus, this latter force is effective to offset in part the downward force differential between the right and left-hand side wheels. In addition, the suspension device is effective to transfer a portion of the twisting force of the axle housing to the sprung assembly at the cross-bar mounting means and also to the lesser weighted wheel to further offset the force differential between the left and right wheels.

Thus, the suspension device constructed in accordance with the present invention is effective in periods of acceleration to offset the effect of the acceleration caused force couple applied to the opposing sides of the axle housing and to also transfer a portion of the force caused by the twisting of the axle housing to a point on the frame where that force no longer may degrade the effectiveness of the coupling between the axle housings and the rear springs.

BRIEF DESCRIPTION OF THE DRAWINGS

The foregoing and other objects of this invention, its various features, as well as the invention, will be more fully understood from the following description, when read together with the accompanying drawings wherein.

DESCRIPTION OF THE PREFERRED EMBODIMENT

Figure 1:
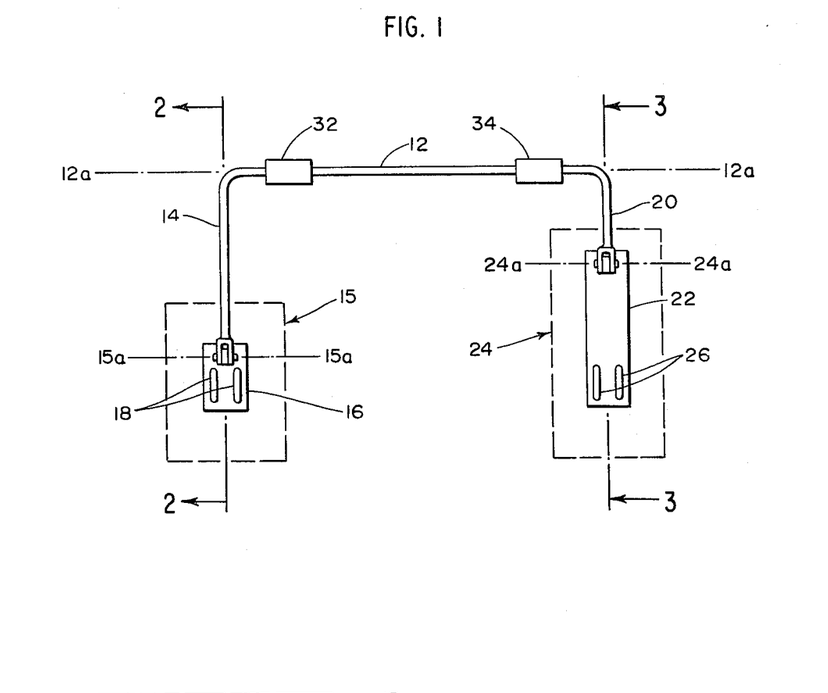
FIG. 1 shows a plan view of an embodiment of the present invention.
Figure 2:
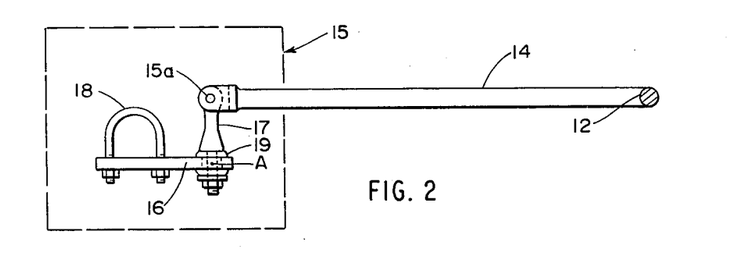
FIG. 2 shows a first side view of the embodiment of FIG. 1.
Figure 3:
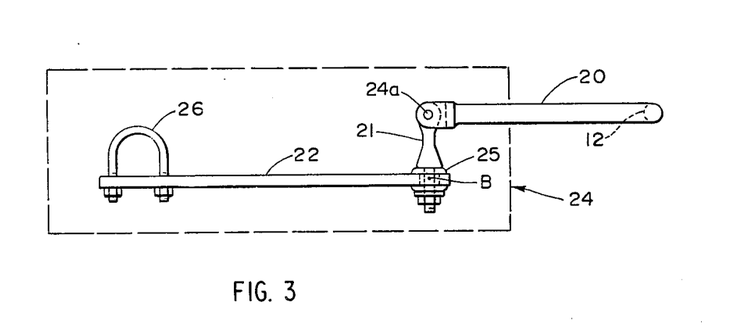
FIG. 3 shows a second side view of the embodiment of FIG. 1.

FIGS. 1, 2 and 3 show an embodiment of the present invention. In the figure, a cross-bar 12 is shown having a first arm 14 extending at substantially a right angle from a point near a first end of the cross-bar 12.

Cross-bar 12 includes connection means 32 and 34 for connecting cross-bar 12 to the frame of an automobile. Connection means 32 and 34 permit rotation of cross-bar 12 about its longitudinal axis 12a. The specific connection means described and illustrated in the present embodiment are for illustrative purposes only. Other functional equivalents may be used. For example, in an alternative configuration, the connection means 32 and 34 may be positioned on extensions of cross-bar 12 which protrude beyond the arms 14 and 20.

It will be further understood that in other embodiments, the shape of cross-bar 12 and arms 14 and 20 may differ from the straight bars as illustrated in FIGS. 1-3 in order to prevent interference with other vehicle components such as may include the exhaust system, gas tank and drive shaft. In addition, the arms 14 and 20 may extend from cross-bar 12 as other than right angles.

The first arm has at its other end a first junction means 15 for connecting the first arm 14 to the drive axle housing of an automobile. As shown in FIGS. 1 and 2, the first junction means 15 includes a U-clamp 18 (for connection to an axle housing), an extension bar 16, and a link 17 having a flexible joint for permitting the arm 14 to pivot about a first joint axis 15a.

Near the other end of cross-bar 12 is a second arm 20 which extends at substantially a right angle therefrom. The arm 20 has at its other end a second junction means 24 for connecting arm 20 to the drive axle housing of an automobile. The second junction means 24 includes a U-clamp 26, an extension bar 22, and a link 21 having a flexible joint for permitting the arm 20 to pivot about a second joint axis 24a.

Resilient bushings 19 and 25 in junction means 15 and 24 permit relatively minor displacement of link 17 with respect to bar 16 and link 21 with respect to bar 22, respectively. In other embodiments, equivalent junction means may be used which permit arms 14 and 20 to pivot about the respective one of axes 15a and 24a. In the embodiment depicted in FIGS. 1-3, it with be noted that the first and second arms 14 and 20 are of unequal length, with the first arm 14 being longer than the second arm 20. In addition, the extension bars 16 and 22 both extend so that the joint axis is between the U-clamp and the cross-bar 12 for each of junction means 15 and 24. The distance between the first joint axis 15a and axis 12 may be as much as five times the distance between the second joint axis 24 and axis 12.

Figure 4:
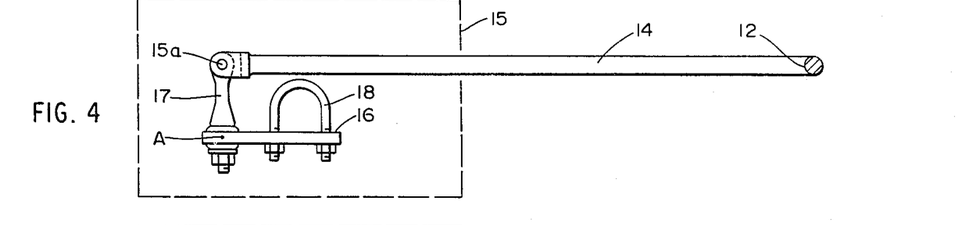
FIG. 4 shows a first side view of a second embodiment of the present invention.
Figure 5:
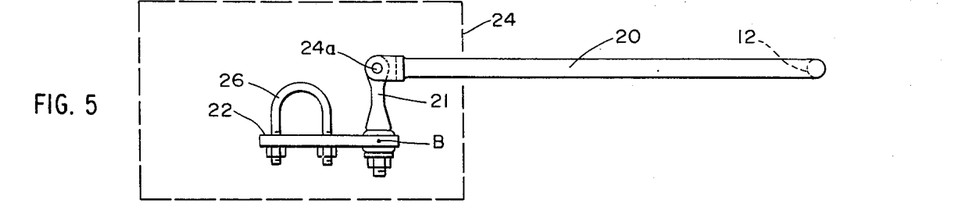
FIG. 5 shows a second side view of a second embodiment of the present invention.

FIGS. 4 and 5 show views of a second embodiment which views are equivalent to the views of the first embodiment shown in FIGS. 2 and 3. Corresponding elements are denoted by identical reference numerals. It will be understood that the cross-bar 12 is the same for both the first and second embodiments. In the second embodiment, arms 14 and 20 are unequal in length but extension bars 16 and 22 extend so that the U-clamp 18 is between the joint axis 15a and axis 12 in junction means 15 and the joint axis 24a is between U-clamp 26 and axis 12 in junction means 24.

Figure 6:
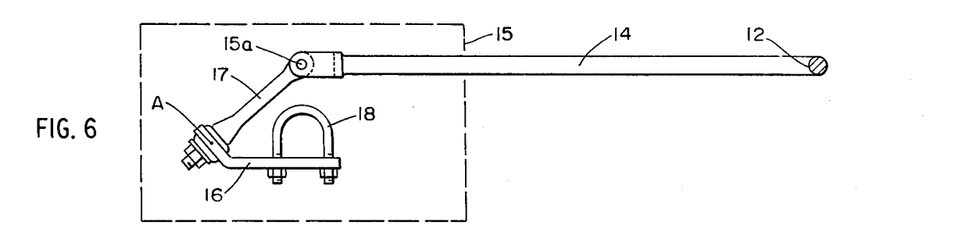
FIG. 6 shows a first side view of a third embodiment of the present invention.
Figure 7:
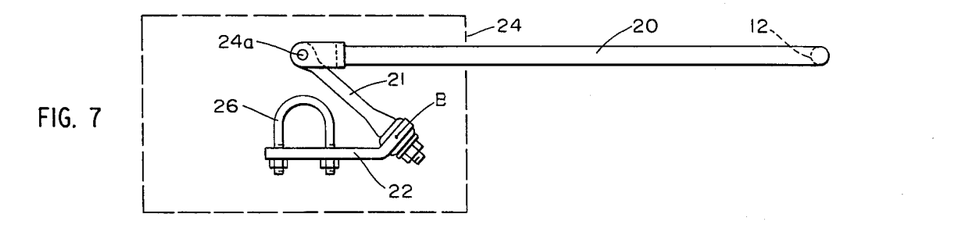
FIG. 7 shows a second side view of a third embodiment of the present invention.

FIGS. 6 and 7 show views of a third embodiment, which views are equivalent to the views of the first embodiment shown in FIGS. 2 and 3. Corresponding elements are denoted by identical reference numerals. It will be understood that the cross-bar 12 is same for both the first and third embodiments. In the third embodiments, arms 14 and 20 are equal length but the junction means 15 and 24 provide that forces may be applied to the endpoints of arms 14 and 20 via links 17 and 21 respectively from point A of bar 16 and point B of bar 22, where point A is a greater distance from axis 12a than point B.

In all three embodiments described above, forces may be applied via extension bar 16 to the endpoint of arm 14 at a greater distance from the cross-bar than those which may be applied via extension bar 22 to the endpoint of arm 20.

Figure 8:
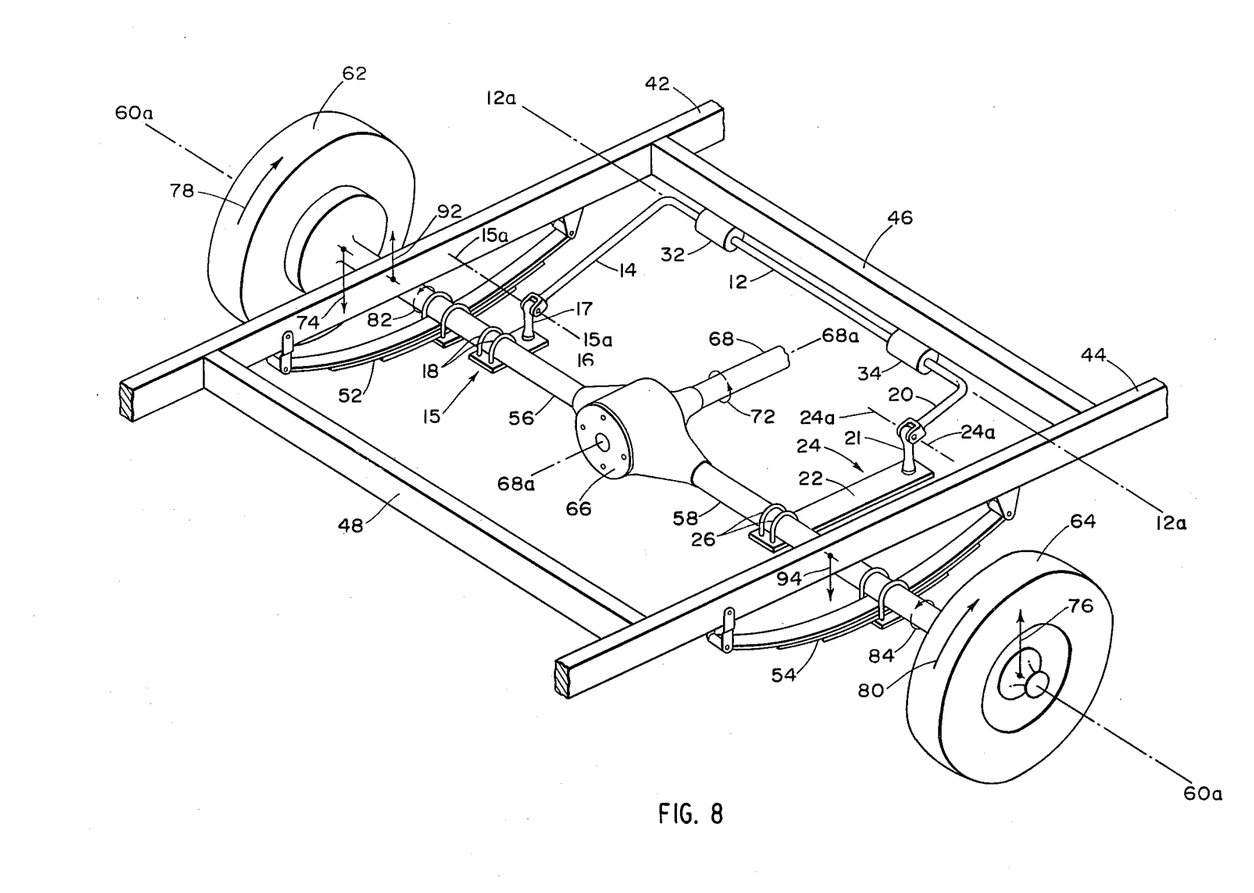
FIG. 8 shows the embodiment of FIG. 1 configured in an illustrative automobile rear suspension assembly.

In FIG. 8, the embodiment described above in FIGS. 1-3 is shown in an operative configuration with the rear suspension of an automobile. In that figure, the portions of the invention having a corresponding relationship to those components in FIGS. 1-3 are identified with the same reference designations as in FIGS. 1-3.

In FIG. 8, a portion of the frame of an automobile is shown including side members 42 and 44 and cross members 46 and 48. It will be understood that the described frame is not a part of the present invention, but is shown for illustrative purposes only.

For example, in automobiles having a unit-body construction, the side members 42 and 44 would correspond to the sub-frame side members and there would be no cross member 46. For such embodiments connection means 32 and 34 would connect cross-bar 12 to the frame side members.

Leaf springs 52 and 54 are connected to the frame side members 42 and 44 respectively, by conventional means. The leaf springs 52 and 54 are connected by conventional U-clamps to the respective ones of left rear axle housings 56 and 58. It will also be understood that in other embodiments, other springing means may be provided to connect the rear axle to the frame, for example, coil springs. The use of leaf springs in the present description is for illustrative purposes only and is not a part of the present invention.

The automobile shown in FIG. 8 has a "solid-type" rear axle assembly. Axle housings 56 and 58 are coaxial with the rear axle axis 60a. In additiion, left rear wheel 62 and right rear wheel 64 are coaxial therewith. The differential housing 66 is shown rigidly connecting axle housings 56 and 58. The differential gear assembly within housing 66 is coupled to the automobile engine by way of drive shaft 68.

The connecting means 32 and 34 are used to mount the embodiment of the present invention on the cross member 46 so that the cross-bar longitudinal axis 12a is substantially parallel to the rear axle axis 60a. Alternatively, connecting means 32 and 34 may be positioned to mount the cross-bar 12 to the side members 42 and 44 in the same manner. It will be understood that the junction means 15 is effective to connect arm 14 to the left rear axle housing 56 in a manner so that arm 14 can pivot with respect to the first joint axis 15a which is substantially parallel to axis 60a. It will be further noted that junction means 24 is effective to similarly connect arm 20 to the right rear axle housing 58 in a manner so that arm 20 can pivot with respect to the second joint axis 24a which is parallel to axis 60a. The U-clamps 18 and 26 provide that a rotation of the rear axle housings 56 and 58 about the axis 60a would result in the pivoting of bars 16 and 22 about the axle axis 60a, i.e. those U-clamps provide a non-pivoting connection.

In operation during periods of forward acceleration, the drive shaft 68 rotates about the axis 68a in the direction indicated by reference arrow 72. As a consequence of shaft rotation in this direction, a force couple is set up about axis 68a on the rear axle assembly including the differential gear assembly, left and right rear axle housings 56 and 58 and the left and right rear wheels 62 and 64. The force couple produces associated forces on the rear wheels applied via the rear axles in the directions shown by reference arrows 74 and 76. An apposing force couple is applied to the frame assembly by way of the mounting assembly for the engine. This latter force couple is in the direction to generate a rotation of the frame about the axis 68a in a direction opposed to the rotation of drive shaft 68. This force couple is represented in FIG. 8 by the reference arrows 92 and 94. It will be understood that in practical applications the forces indicated by arrows 74 and 76 are larger than those indicated by arrows 92 and 94.

During rapid acceleration, as a result of the forces 74 and 92 on the left side and forces 76 and 94 on the right side, the left wheel 62 tends to be displaced away from frame member 42 and the right wheel 64 tends to be displaced toward frame member 44.

In addition, as the wheels are driven in a forward direction (indicated by reference arrows 78 and 80) while being maintained in good frictional contact with the road surface, twisting forces are applied to both the left and right axle housings in an opposing direction to the wheel rotation (represented by reference arrows 82 and 84).

It will be understood that the following two effects result during periods of high forward acceleration as a consequence of the forces discussed above. The first effect, due to the force couple 74 and 76 and force couple 92 and 94, results in the right rear wheel being displaced in an upward direction relative to the frame 44 and being lesser weighted than the left rear wheel with the consequence that traction with the road surface is less for that wheel than for the left rear wheel 62. The lesser weighted rear wheel may then break away or lose its frictional contact with the road surface resulting in a wheel slippage during periods of high acceleration.

A second effect is the twisting of the axle housings 56 and 58 with respect to the U-clamp mounts for springs 52 and 54. When acceleration is sufficiently high and consequently the forces 82 and 84 are sufficiently great, the U-clamp connecting means or the spring mounting means may break or one or more leaves of the springs themselves may break.

These foregoing two effects are offset by the present invention in the following manner. The upward displacement of the right rear wheel with respect to the side frame member 44 is transferred by the second junction means 24 (via U-clamp 26, extension bar 22 and link 21) to the flexible joint at the endpoint of arm 20 of the present invention. Since the extension bar 22 is rigidly attached to the right rear axle housing 58, the link 21 is displaced similarly in the upward direction, with the result that the arm 20 is provided with a resultant force at its extremal point, (i.e. at the flexible joint), which force tends to rotate the extremal point of the arm 20 about the longitudinal axis 12a of cross-bar 12. The force applied to arm 20 at its extremal point is transferred by way of cross-bar 12 and the first arm 14 and junction means 15 to the left rear axle housing 56. As a result, a portion of the vertically upward force 76 at the right rear wheel is transferred to the opposite side where it offsets the vertical downward force 74. The net effect is to lessen the downward force components at the left rear wheel and to lessen the upward force components at the right rear wheel, i.e. the relative unweighting of the right wheel compared with the left wheel.

In addition, the twisting force 84 applied to the right rear axle housing 58 is effective to cause extension bar 22 to tend to rotate about the rear axle axis 60a. As a result, the twisting force 84 is transferred to provide substantially upward force on the link 21. A portion of the force transferred to the link 21 is transferred again to the frame in the form of a vertical upward force at connection means 34. In part, this transferred force offsets the force differential caused by force couple 92 and 94. The remaining portion of the twisting forces 82 and 84 applied to the rear axle housings are also transferred to the endpoint of arm 20 (at the flexible joint). This portion of the force at the endpoint of arm 20 produces a torque on arm 20 about the axis 12a. This torque on arm 20 is coupled via the cross-bar 12, the first arm 14 and junction means 15 to provide a vertical upward force on the left axle housing 56 and wheel 62, with a resultant unweighting of the left rear wheel 62 with respect to the right rear wheel 64.

In this manner, the forces resultant from periods of forward acceleration are transformed to force components selected to offset the inherent tendency to unweight the right rear wheel relative to the left rear wheel.

It will be further understood that other displacements of the frame with respect to the axle assembly (such as produced by lean of the frame when traveling around a curve) will be similarly compensated in the manner described for the vertical displacements attributed to force couples 74 and 76.

Thus, the suspension device constructed in accordance with the present invention is effective in periods of acceleration to offset the effect of the force couple applied to opposing sides of the axle housings and also the twisting force of the axle housings. It will be understood that the conventional stabilizer bar provides a compensatory force transfer tending to equalize the downward force on each rear wheel only for the case of an unmatched vertical displacement of a first rear wheel relative to the vehicle frame. However, such unmatched vertical displacement is generally of relatively small magnitude during periods of acceleration and consequently the conventional stabilizer bar is not effective to transfer a sufficient force to completely offset the unequal wheel weight effect. It will be further understood that the conventional torque arm transfers the reaction twisting force on the axle housing to a point on the frame, thereby relieving strain on the spring mounting and connecting means but providing minimal compensation for the wheel unweighting problem. On the other hand, the present invention transforms both unmatched vertical displacements of a rear wheel and also the reaction twisting force on the axle housing to a compensatory upward vertical force on the opposing rear wheel. This resultant compensatory force serves to offset the heretofor inadequately treated wheel unweighting problem.

Using the embodiment of FIGS. 1–3, the present invention may be used in a configuration related to that shown in FIG. 8. In the related configuration the suspension device is oriented in a different position wherein the cross-bar 12 is connected to the cross member 48 (or to side members 42 and 44) behind the axle assembly, the arm 14 and junction means 16 are associated with and connected to the right axle housing 58, and the arm 20, joint axis 24a, extension bar 22 and U-clamp 26 are associated with and connected to the left axle housing 56. In this configuration, the suspension device functions in substantially the same manner as described above. Similarly, the embodiments shown in FIGS. 4, 5, and 6, 7 may be configured with cross-bar 12 mounted to the rear of the drive axle. The embodiments of FIGS. 1–7 may also be utilized in an identical manner as described above in conjunction with the front suspension for a vehicle configuration where the front axle assembly provides the drive force.

Figure 9:
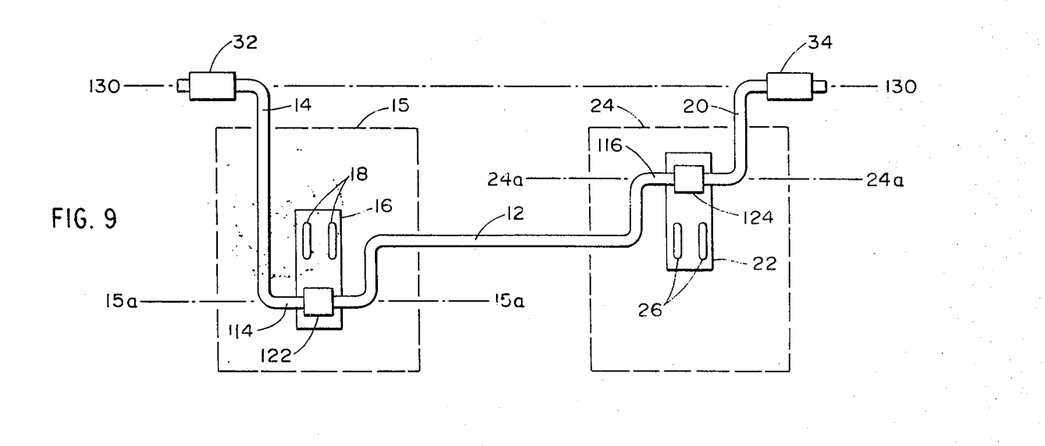
FIG. 9 shows a plan view of a fourth embodiment of the present invention.
Figure 10:
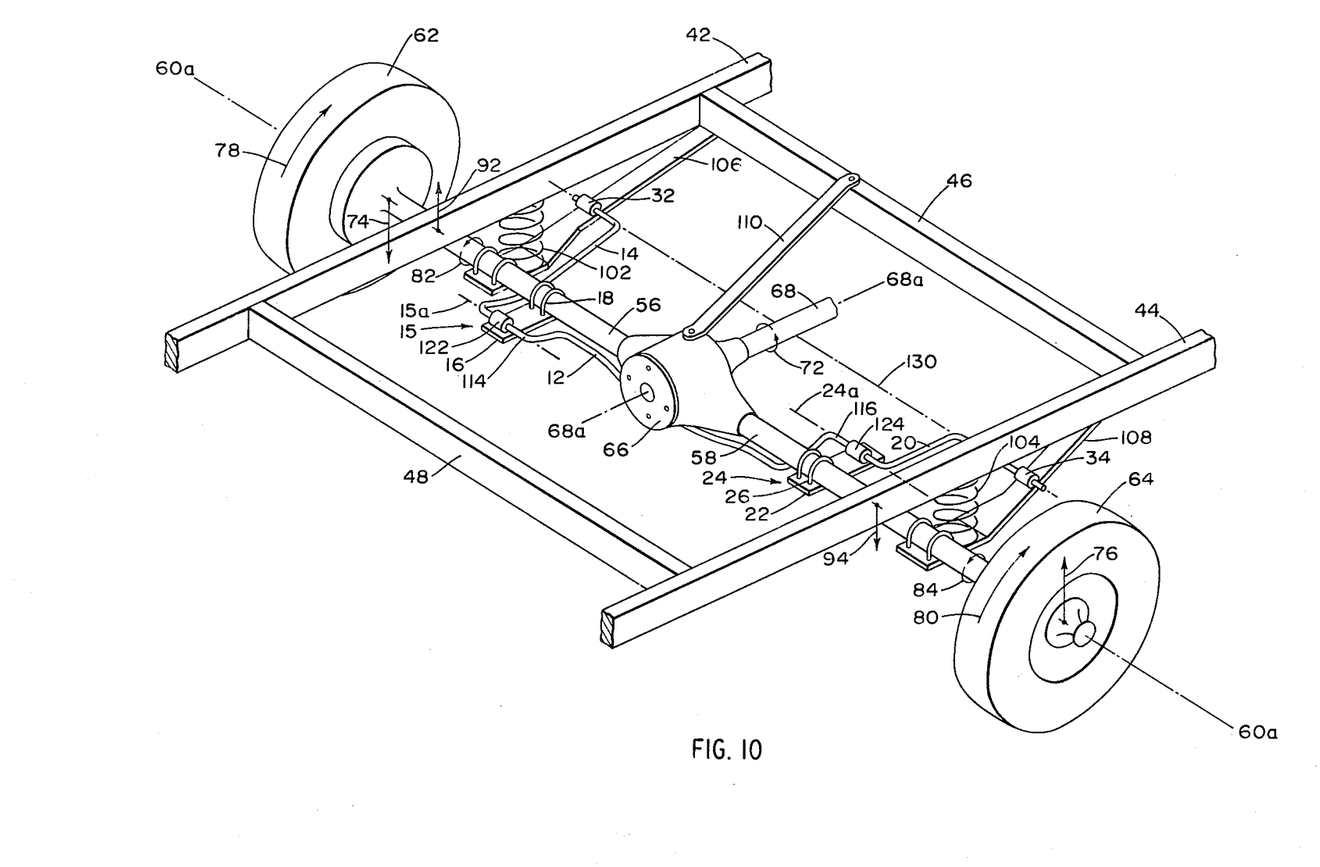
FIG. 10 shows the embodiment of FIG. 9 configured in an illustrative automobile rear suspension assembly.

The present invention may also be configured in an embodiment suitable for application in a vehicle having a coil spring suspension (in lieu of the leaf spring suspension described in conjunction with the aforementioned embodiments). FIG. 9 shows such a configuration for a rear wheel drive vehicle. FIG. 10 shows the embodiment of FIG. 9 in an exemplary vehicle. In those figures, elements related to corresponding parts in FIG. 8 are denoted with identical reference numerals.

The embodiment shown in FIG. 9 includes a cross-bar 12 having offset portions 114 and 116 near the endpoints of bar 12 and arms 14 and 20 extending at substantially right angles therefrom. Offset portions 114 and 116 have parallel longitudinal (first and second joint) axes 15a and 24a. Offset portions 114 and 116 are connected to a respective one of junction means 15 and 14. Junction means 15 includes a U-clamp 18 (for connection to axle housing 56) a extension bar 16 and a connection means 122 (for connection to offset portion 114 of cross-bar 112 in a manner permitting arm 14 to rotate about the first joint axis 15a). Similarly, junction means 24 includes U-clamp 16, extension bar 22 and connection means 124. The arms 14 and 20 have at their extremal points connection means 32 and 34, respectively, to connect each arm to the sprung assembly in a manner permitting arms 14 and 20 to rotate freely about the axis 130.

In the exemplary coil spring suspension system of FIG. 10, the drive axle assembly includes drive shaft 68, differential gear assembly housing 66, axle housings 56 and 58, and drive wheels 62 and 64. The sprung assembly includes side members 42 and 44 and cross-members 48 and 48. The sprung assembly is coupled to the drive axle assembly by coil spring 102 and 104 which are mounted on a respective one of brackets 106 and 108. Each of brackets 106 and 108 is connected by U-clamps at a first end to an associated side of the axle housing. At the other end each of brackets 106 and 108 is connected to the associated one of side members 42 and 44. A further bracket 110 connects the differential housing 66 to cross-member 46.

The presently described embodiment is shown in FIG. 10 to be mounted by junction means 15 and 24 to have the longitudinal axes of offset portions 114 and 116 parallel to the rear axle axis 60a. The connection means 32 and 34 connect the extremal ends of arm 14 and 20 to the respective ones of brackets 106 and 108.

In operation, the axle housing twist forces 82 and 84 are transferred to the cross-bar (via the U-clamps 18 and 26, extension bars 16 and 22, and connection means 122 and 124) at offset portions 114 and 116. It will be understood that the force 82 is applied to cross-bar 12 at a greater distance that is the force 84 (i.e. the distance between axis 15a and 130 versus axes 24a and 130). Consequently a correspondingly greater portion of the overall axle housing twist force is effectively applied to frame section 44 (than is applied to section 42) to offset the relative wheel unweighting established by force couples 92, 94, and 74, 76. In addition, a portion of the axle housing twist force is applied to both sides of the sprung assembly to reduce the effect of the excess axle housing twist force on the spring mounting means.

The invention may be embodied in other specific forms without department from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In an automotive vehicle having a sprung frame assembly and an unsprung drive axle assembly, said axle assembly including two wheels and a wheel driving means and housing therefor, said housing having a section associated with each of said wheels, the improvement comprising a suspension device including:
    a. a cross-bar having a first arm extending from a point near one cross-bar endpoint and being associated with the housing section associated with with one of said wheels, and a second arm extending from a point near the other cross-bar endpoint, and being associated with the housing section associated with the other of said wheels, and wherein said cross bar includes a cross-bar connection means for connecting said cross-bar to said vehicle sprung frame assembly, said cross-bar connection means permitting rotation of said cross-bar about the longitudinal axis of said cross-bar.
    b. a first junction means associated with said first arm, said first junction means including a first extension bar, a flexible joint for pivotally connecting said first arm to said first extension bar, and a connection means for rigidly connecting said extension bar to said associated housing section, and
    c. a second junction means associated with said second arm, said second junction means including a second extension bar, a flexible joint for pivotally connecting said second arm to said second extension bar, and a connection means for rigidly connecting said extension bar to said associated housing section, wherein forces applied by said first extension bar to said first arm are applied at a greater distance from said cross-bar longitudinal axis than are forces applied by said second extension bar to said second arm.

2. The device according to claim 1 wherein said first arm is longer than said second arm and said first and second extension bars extend toward said cross-bar from said axle housing.

3. The device according to claim 1 wherein said first arm is longer than said second arm and said first extension bar extends away from said cross-bar from said axle housing and said second extension bar extends toward said cross-bar from said axle housing.

4. The device according to claim 1 wherein said first and second arms have equal length and said first extension bar extends away from said cross-bar from said axle housing and said second extension bar extends toward said cross-bar from said axle housing.

5. The device according to claim 1 wherein said cross-bar connection means connects said cross-bar to said vehicle sprung frame assembly forward of said drive axle assembly, said first junction means connects said first arm to said housing section associated with the one of said wheels on the left side of said drive axle assembly, and said second junction means connects said second arm to said housing section associated with the other wheel.

6. The device according to claim 1 wherein said cross-bar connection means connects said cross-bar to said vehicle sprung frame assembly to the rear of said drive axle assembly, said first junction means connects said first arm to said housing section associated with the one of said wheels on the right side of said drive axle assembly, and said second junction means connects said second arm to said housing section associated with the other wheel.

* * * * *

UNITED STATES PATENT AND TRADEMARK OFFICE
CERTIFICATE OF CORRECTION

PATENT NO. : 3,885,775
DATED : May 27, 1975
INVENTOR(S) : Germain G. Bolduc

It is certified that error appears in the above-identified patent and that said Letters Patent are hereby corrected as shown below:

Column 5, line 48:    "with" should read --will--;

Column 6, line 5:     "is same" should read --is the same--;

Column 9, line 39:    "a" should read --an--;

Column 9, line 54:    "members 48 and 48" should read --members 46 and 48--;

Column 10, line 7:    "that" should read --than--;

Column 10, line 19:   "department" should read --departing--;

Column 10, line 37:   Following "associated with" delete --with--

PATENT OFFICE ERRORS

Column 1, line 29:    After "drive" insert --axle--;

Column 3, line 29:    "dirve" should read --drive--;

Column 3, lines 63 and 64:    Add quotes to --lesser weighted--;

Column 5, line 5:     "the" should read --that--;

Column 7, line 16:    "apposing" should read --opposing--;

Column 9, line 43:    "16" should read --26--.

Signed and Sealed this twenty-eight Day of October 1975

[SEAL]

Attest:

RUTH C. MASON
Attesting Officer

C. MARSHALL DANN
Commissioner of Patents and Trademarks